US012750656B2

(12) United States Patent
Liu

(10) Patent No.: US 12,750,656 B2
(45) Date of Patent: Sep. 29, 2026

(54) MANAGEMENT OF MULTIPLE SUBSCRIBER IDENTITIES IN WIRELESS COMMUNICATIONS

(71) Applicant: ZTE Corporation, Shenzhen (CN)

(72) Inventor: Ruiqi Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 388 days.

(21) Appl. No.: 18/506,634

(22) Filed: Nov. 10, 2023

(65) Prior Publication Data

US 2024/0155327 A1 May 9, 2024

Related U.S. Application Data

(63) Continuation of application No. PCT/CN2021/095033, filed on May 21, 2021.

(51) Int. Cl.

*H04W 8/18* (2009.01)
*H04W 36/00* (2009.01)
*H04W 76/15* (2018.01)
*H04W 88/06* (2009.01)

(52) U.S. Cl.

CPC ....... *H04W 8/183* (2013.01); *H04W 36/0058* (2018.08); *H04W 36/0085* (2018.08); *H04W 76/15* (2018.02); *H04W 88/06* (2013.01)

(58) Field of Classification Search

CPC . H04W 88/06; H04W 24/10; H04W 36/0058; H04W 36/0085; H04W 12/45; H04W 8/183; H04W 76/15; H04W 24/00; Y02D 30/70

See application file for complete search history.

(56) References Cited

U.S. PATENT DOCUMENTS

2015/0289141 A1 10/2015 Ghasemzadeh et al.
2018/0070303 A1* 3/2018 Tambaram Kailasam .................. H04W 52/0209
2022/0312292 A1* 9/2022 Hong ................ H04W 36/0058

FOREIGN PATENT DOCUMENTS

| | | | |
|---|---|---|---|
| CN | 105706501 | A | 6/2016 |
| CN | 108605282 | A | 9/2018 |
| CN | 110958632 | A | 4/2020 |
| CN | 111314931 | A | 6/2020 |
| CN | 111758282 | A | 10/2020 |
| WO | 2022241746 | A1 | 11/2022 |

OTHER PUBLICATIONS

International Search Report for International Application No. PCT/CN2021/095033, Mail Date: Jan. 28, 2022. 8 pages.

* cited by examiner

*Primary Examiner* — Nam T Huynh
(74) *Attorney, Agent, or Firm* — Ashurst Perkins Coie US LLP

(57) ABSTRACT

Systems, apparatus and methods for wireless communication are described, and more specifically, to techniques related to managing multiple subscriber identity modules (SIMs). One example method for wireless communication includes selecting, by a wireless device configured with at least a first subscriber identity module (SIM) and a second SIM, a primary SIM, performing a measurement of a reference signal configured for the primary SIM to obtain a primary result associated with the primary SIM, and reporting the primary result. The primary result can then be applied to other SIMs configured on the wireless device.

20 Claims, 4 Drawing Sheets

MANAGEMENT OF MULTIPLE SUBSCRIBER IDENTITIES IN WIRELESS COMMUNICATIONS

CROSS REFERENCE TO RELATED APPLICATIONS

This patent document is a continuation of and claims benefit of priority to International Patent Application No. PCT/CN2021/095033, filed on May 21, 2021. The entire content of the before-mentioned patent application is incorporated by reference as part of the disclosure of this application.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices, as well as support an increasingly mobile society.

SUMMARY

This document relates to methods, systems, and devices for managing multiple subscriber identity modules (SIMs) in mobile communication technology, including 5th Generation (5G), new radio (NR), 4th Generation (4G), and long-term evolution (LTE) communication systems.

In one exemplary aspect, a wireless communication method is disclosed. The method includes selecting, by a wireless device configured with at least a first subscriber identity module (SIM) and a second SIM, a primary SIM, performing a measurement of a reference signal configured for the primary SIM to obtain a primary result associated with the primary SIM, and reporting the primary result.

In another exemplary aspect, a wireless communication method is disclosed. The method includes transmitting, by a network device, a reference signal and receiving, from a wireless device configured with at least a first subscriber identity module (SIM) and a second SIM, a primary measurement result of the reference signal, wherein the primary measurement result is associated a primary SIM of the wireless device.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Section headings are used in the present document only to improve readability and do not limit scope of the disclosed embodiments and techniques in each section to only that section. Certain features are described using the example of Fifth Generation (5G) wireless protocol. However, applicability of the disclosed techniques is not limited to only 5G wireless systems.

Figure 1:
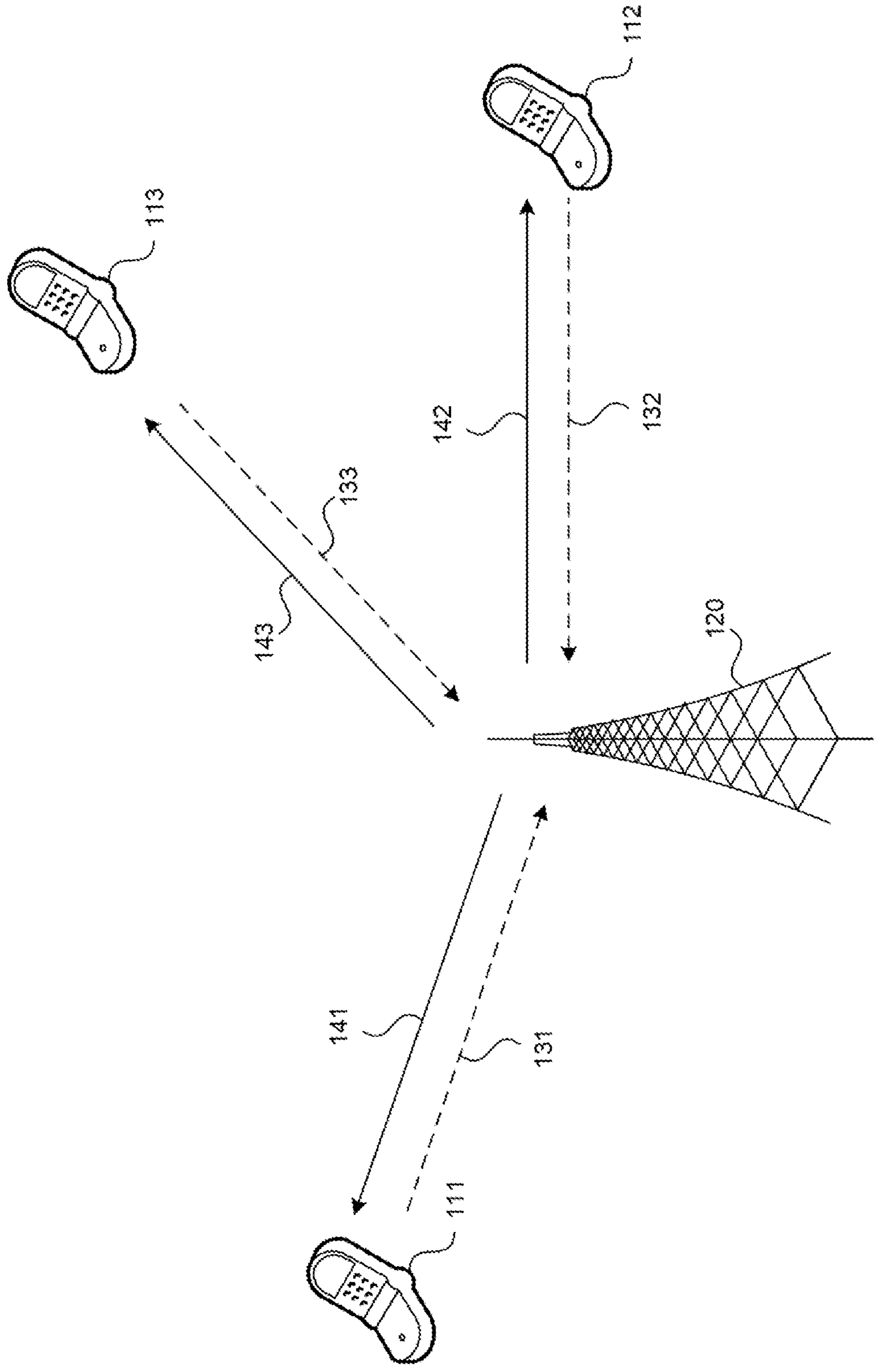
FIG. 1 shows an example of a wireless communication system that includes a base station (BS) and user equipment (UE).

FIG. 1 shows an example of a wireless communication system (e.g., a long term evolution (LTE), 5G or NR cellular network) that includes a BS 120 and one or more user equipment (UE) 111, 112 and 113. In some embodiments, the uplink transmissions (131, 132, 133) can include uplink control information (UCI), higher layer signaling (e.g., UE assistance information or UE capability), or uplink information. In some embodiments, the downlink transmissions (141, 142, 143) can include DCI or high layer signaling or downlink information. The UE may be, for example, a smartphone, a tablet, a mobile computer, a machine to machine (M2M) device, a terminal, a mobile device, an Internet of Things (IoT) device, and so on.

The present document uses section headings and sub-headings for facilitating easy understanding and not for limiting the scope of the disclosed techniques and embodiments to certain sections. Accordingly, embodiments disclosed in different sections can be used with each other. Furthermore, the present document uses examples from the 3GPP NR network architecture and 5G protocol only to facilitate understanding and the disclosed techniques and embodiments may be practiced in other wireless systems that use different communication protocols than the 3GPP protocols.

Multi-SIM Measurements

UEs can be equipped with multiple SIMs. For example, a UE can be configured to operate with multiple SIM cards, embedded-SIMs (eSIMs), virtual SIMs, or any combinations of these. Having more than one SIM in a UE is justified by multiple reasons. For instance, a user may wish to have one phone number for work and a separate phone number to communicate with family and friends. In another example, the user may one number for voice calls and another number for data or internet access. By using multiple SIMs with different mobile network operators (MNOs, also referred to as "operators"), a user may be able to reduce phone plan costs or obtain a desired coverage, e.g., when traveling.

Radio Resource Management (RRM) encompasses a wide range of techniques and procedures, including power control, scheduling, cell search, cell reselection, handover, radio link or connection monitoring, and connection establishment and re-establishment. RRM comprises various of procedures carried out on the UE side, where the UE is required to measure reference signals, such as a Synchronization Signal Block (SSB) or a Channel State Information Reference Signal (CSI-RS) and report the measurement results to the network so that the network is informed of the mobility condition of the UE. RRM is used mainly for mobility control.

For example, a UE can measure SSB and report Reference Signal Received Power (RSRP), Reference Signal Received Quality (RSRQ), or Received Signal Strength Indicator (RSSI) to the network. The report may comprise a one-shot measurement, multiple samples, or a filtered result of multiple samples. The network receives the results and can use the results to tell if the UE needs to be handed over to another cell, if a new beam is needed because the current beam is failing, etc. For example, if the UE reports the RSRP of a current serving cell as decreasing gradually, then the network can determine that the UE may be moving towards a cell edge and may need to be handed over to another cell. In meantime, the UE can also measure reference signals from neighboring cells and report the measurement results for the neighbor cells. For example, if the RSRP associated with a neighboring cell is increasing, then the network can determine that the UE is approaching the neighboring cell, and the network can trigger a handover of the UE from the old cell to the new cell.

Thus, for quality of service (QoS) control and mobility control, the UE needs to perform RRM measurements and report the measurement results to the network. Note that some measurement results are not reported, which can be used to facilitate local decisions at the UE. For example, a UE can measure reference signals when performing radio frequency (RF) calibration, such as to calibrate positioning.

When equipped with multiple SIM cards, currently what a UE will do is left to UE implementation. For example, a UE configured with multiple SIMs may perform a measurement for each SIM and report the results. This may be an inefficient use of resources since measurement results from the same UE are likely to be similar or identical. Thus, techniques to share measurement results across multiple SIMs are needed.

Methods are described for sharing RRM results across different SIMs. The methods can apply to both LTE (two LTE SIMs), NR (two NR SIMs), LTE+NR (one SIM on LTE network and one SIM on NR network). This method can also apply to other generation cellular networks, such as 3G (GSM), 2G, etc. It is also possible for one UE to have more than two SIMs, such as three or more, and these methods can also apply to higher numbers of SIMs. In addition, other measurement results besides RRM measurements may be shared, such as positioning measurements. Sharing measurement results can save UE power since the UE will not need to measure all reference signals for all SIM cards, but only for one card. The UE can reuse that result for multiple SIM cards if the SIM cards are from a same operator or different operators sharing a base station.

Different operators, such as regional or national operators, may share a base station. They may share the BS in certain frequency bands or in certain regions. Operators may build and share BS's to save costs and increase coverage.

In some embodiments, if a UE is configured with multiple SIMs from the same operator, then a UE can measure reference signals configured for only one SIM and directly apply the measurement results to all other SIMs which are from a same operator. The UE can separately report the measurement results for all SIMs using the same result.

In some embodiments, a UE can measure reference signals configured for only one SIM and directly apply the measurement results to all other SIMs which are from the same operator. The UE can report the measurement results for only one SIM, and also transmit an indication to the network that these results apply for other SIMs. In some embodiments, the network can send a control signal to the UE to tell the UE not to do this sharing. For example, the UE can start a timer once received this control signal and after the timer expires, the UE can begin to share measurement results again.

In some embodiments, when a UE first camps at a cell, the UE can register multiple SIMs as able to share RRM results. For example, when a UE configured with two SIMs camps at a cell, the UE can transmit an indication to the BS that measurements of reference signals configured for either SIM apply to the other SIM. Then, the UE can perform RRM measurements as configured by the network. The UE can measure reference signals configured for only one SIM and directly apply the measurement results to any or all other SIMs which are from a same operator. The measurement results can also apply to other SIMs from different MNOs if those MNOs share the BS with each other. The UE can report the measurement results for the one SIM. No extra signaling is needed at this stage, since multiple SIMs are already registered as able to share RRM results. This eliminates the need to transmit an indication for each measurement report. In some embodiments, the status "able to share RRM results" can be disabled by the UE and/or the network.

In some embodiments, a UE can choose which public land mobile network (PLMN) is the primary PLMN and send RRM results on a corresponding SIM associated with that PLMN. The UE can send an indication to register multiple SIMs as "able to share RRM results" only to the primary PLMN, or to all PLMNs associated with a SIM on the UE.

If the UE has multiple SIMs which are from different operators, then it may be advantageous for the UE to know whether those operators share a BS. A BS may be shared among the operators on certain bands or frequency ranges (FRs), such as FR1 or FR2. If the operators all have independent BS's, then there is no sharing.

Information regarding whether operators share a BS can be put into broadcast information, such as a Master Information Block (MIB) or a System Information Block (SIB). For instance, take an example BS shared by Verizon, T-Mobile, and AT&T. A cell operated by Verizon can broadcast in MIB or SIB an indication that the cell or BS is shared with T-Mobile an AT&T. For example, this broadcast can include PLMN values, e.g., PLMN IDs, corresponding to AT&T and T-Mobile in the particular country/region. A UE served by the cell can receive this message and determine the sharing relationship. In some embodiments, this message can be broadcast in SSB or CSI-RS. In some embodiments, the message can include further detail. For instance, the message can indicate which bands or ranges are shared by which operators. For example, a BS can be shared between Verizon and AT&T on band 34, band 41, and band 50 while being shared between Verizon and T-Mobile on band 34 and band 42. A band can be either Time Division Duplexed (TTD) or Frequency Division Duplexed (FDD). Also, multiple operators can share a BS without sharing a band. For example, if AT&T and Verizon build and share a BS, AT&T can use band n41 while Verizon uses band n30.

Once a UE determines the sharing relationship between operators, the UE can then determine if measurement results can be shared. For example, a UE can have two SIMs, one from Verizon and one from AT&T. After the UE receives MIB or SIB from the example BS described above, the UE can determine that measurement results can be shared. Thus, the UE can only measure on one SIM entity and save power by not measuring reference signals for other SIMs.

In some embodiments, sharing information can be updated, such as when the UE moves out of a cell, or one of multiple SIMs is switched off. When a UE moves to a new cell and receives service from a new BS, the new BS may or may not be shared. The UE can receive information regarding BS sharing, such as from MIB or SIB. When the UE discovers a new sharing relationship, or the UE is handed over to another cell, the UE can again send a message indicating whether any SIMs can share measurement results.

In some embodiments, if the UE stops sharing RRM results and reports the results to all PLMNs, then the UE does not transmit an update indicating that RRM sharing will be stopped. Instead, the UE can just send reports to all PLMNs. Alternatively, the UE can send the report indicating that RRM sharing will be stopped.

The network can store information regarding BS sharing. For instance, AT&T's network can store the info that some BSs are shared with Verizon, while Verizon's network can also store sharing info with AT&T. As described above, the network can broadcast this info in MIB or SIB.

In some embodiments, there can be a primary PLMN for a UE. Once the primary network receives an indication from the UE that multiple SIMs are able to share RRM results, the primary network will receive the RRM results and share the results with secondary networks. For instance, an example UE has two SIMs from AT&T and Verizon respectively. The UE selects AT&T as its primary PLMN and registers the two SIMs as able to share RRM results. This registration can be transmitted to the primary PLMN or both PLMNs. Depending on whether the UE transmits this message to the primary PLMN or all PLMNs, AT&T's network will know that RRM results can be shared, or both AT&T and Verizon's network controller will know it.

If the UE only sends the registration message to the primary PLMN, the primary network can send a message to all secondary networks indicative of the registration. If the primary network later receives RRM results, the primary network can also send the results to all secondary networks.

If the UE sends the registration message to all PLMNs, when the primary network receives later RRM results, the primary network can send the results to all secondary networks.

In some embodiments, sharing information can be updated, such as when the UE moves out of a cell, or one of multiple SIMs is switched off. The UE can receive information regarding BS sharing from a new BS, such as from MIB or SIB. When the UE discovers a new sharing relationship, or the UE is handed over to another cell, the UE can again send a message indicating whether any SIMs can share measurement results. After receiving such indications, the primary network, or all networks, can update the UE status.

In some embodiments, measurement result sharing between multiple SIMs as described above can apply for a UE in Radio Resource Control (RRC) IDLE, INACTIVE, and CONNECTED mode. They can also apply to LTE (4G) and NR (5G) and also 2G and 3G.

In some embodiments, RRM results can be shared for multiple SIMs configured for the same frequency range, such as FR1 or FR2. For example, a UE can have SIM1 from AT&T in connected mode, working on the FR1 band and SIM2 from Verizon in idle mode, camped on the FR1 band. Though these two bands may be different, they are both on FR1, and measurement results can be shared. In some embodiments, RRM results can be shared across different FRs. For example, a UE can have SIM1 from AT&T in connected mode, working on the FR1 band and SIM2 from Verizon in idle mode, camped on the FR2 band.

Primary PLMN

As described above, a UE with multiple SIMs can select a primary SIM for performing measurements.

In some embodiments, all SIMs can be in the same mode, such as RRC IDLE mode. In this case, a UE can select any SIM as a primary SIM. For example, a UE can have two SIMs, one from AT&T and one from Verizon. SIM 1 on AT&T is in IDLE mode. SIM 2 is from Verizon, currently in IDLE mode. The two SIMs are both in IDLE mode, and the RRM requirements for IDLE mode are the same for both, which means the two SIMs are required to measure the same reference signals with the same periodicity and report the results in the same periodicity (e.g., once every 1280 ms). Thus, the results can be shared perfectly.

In some embodiments, a SIM with a more active RRC mode can be selected as the primary SIM. For example, a SIM that is in RRC CONNECTED mode is more active than a SIM in RRC INACTIVE or RRC IDLE mode. For example, a UE can have two SIMs, one from AT&T and one from Verizon. SIM 1 on AT&T is switched on and currently used for internet, and thus, is in RRC CONNECTED mode. SIM 2 is from Verizon, currently in IDLE mode. SIM 1 in CONNECTED mode is required to measure reference signals more frequently than in IDLE mode to ensure the radio link will not fail or to reestablish to a new link if needed. Thus, SIM 1 under CONNECTED mode can be selected as the primary SIM, and SIM 2 in IDLE mode is not required to measure anything because the SIM in CONNECTED mode measures reference signals more frequently.

The UE can report results for SIMs associated with the secondary network using results obtained from the primary SIM. The UE can report a simpler version compared to a normal measurement result.

As described above, the UE can register multiple SIMs as able to share RRM results. In this case, the primary network can forward a simplified version of measurement results to the secondary network(s) if multiple operators share the BS.

Note, a UE in RRC_IDLE and RRC_INACTIVE usually does not report anything to the network, but if the UE supports IdleInactiveMeasurements-r16 or idleInactiveEUTRA-MeasReport-r16 then it can report measurements. In TS 38.133, it is disclosed that a UE shall be able to report idle mode CA measurements when idle mode CA measurement reporting is requested by the network. But if the UE does not support IdleInactiveMeasurements-r16 or idleInactiveEUTRA-MeasReport-r16, it will still measure, but not report.

Figure 2A:
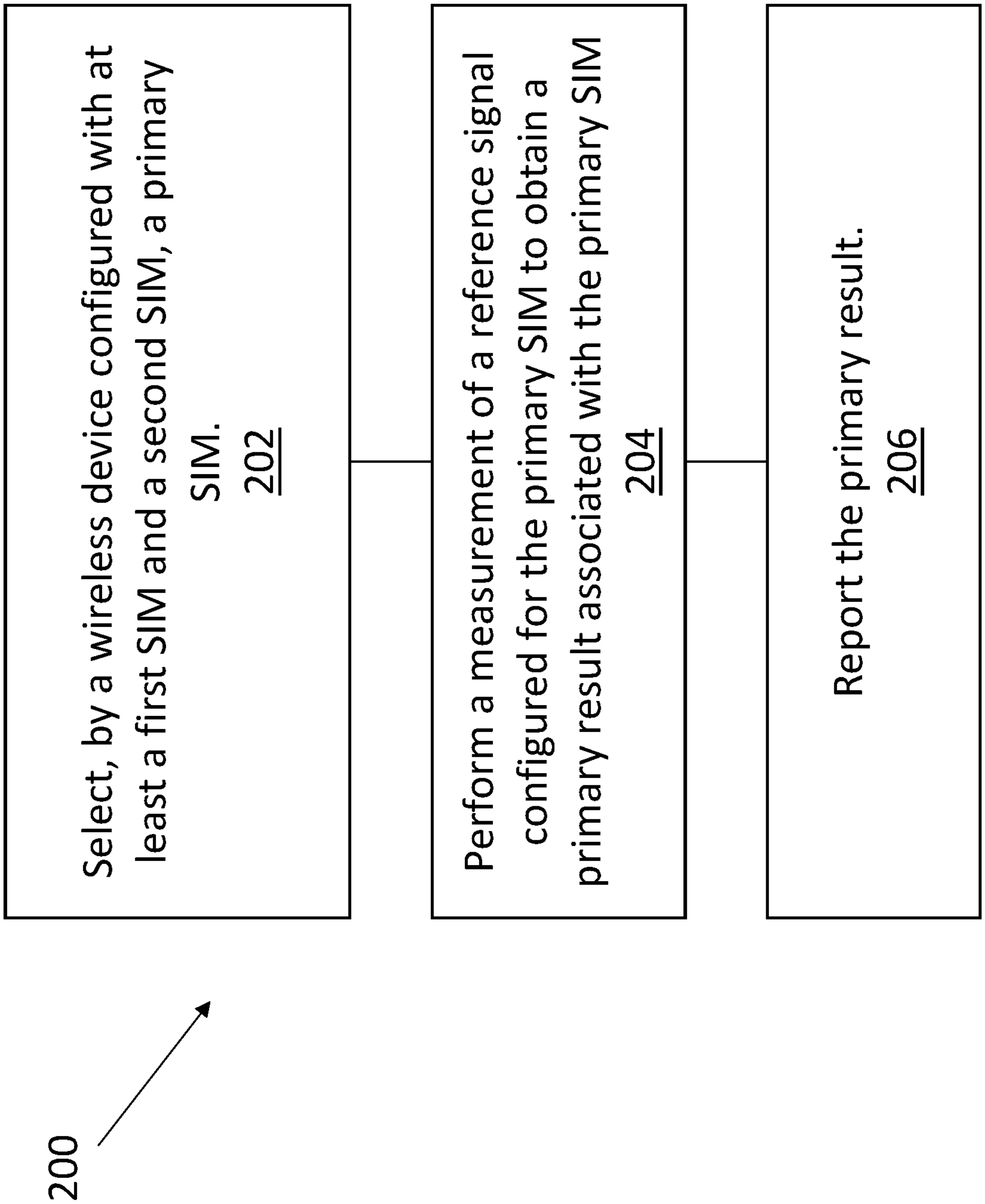
FIG. 2A shows an example method of wireless communication.

FIG. 2A shows an example method 200. At 202 a primary SIM is selected by a wireless device configured with at least a first SIM and a second SIM. For example, the first SIM, the second SIM, or another SIM if configured can be selected as the primary SIM. The first SIM and the second SIM can be associated with the same MNO or with different MNOs. The SIMs can be in any suitable form, such as SIM cards, virtual SIMs, eSIMs, or any combination thereof. At 204, a measurement is performed of a reference signal configured for the primary SIM to obtain a primary result associated with the primary SIM. In some embodiments, the measurement can be an RRM measurement or an RF calibration measurement, such as a positioning measurement. For example, the primary result can be a measurement result of the reference signal. At 206, the primary result is reported. For example, the primary result can be reported for the primary SIM. In some embodiments, the primary result can be applied for a secondary SIM and reported separately. In some embodiments, the wireless device can transmit an indication that the primary result applies to a secondary SIM.

Some embodiments may preferably incorporate the following solutions as described herein.

For example, the solutions listed below may be used by wireless device implementations for reporting reference signals as described herein.

1. A method of wireless communication (e.g., method 200 of FIG. 2A) comprising: selecting, by a wireless device configured with at least a first subscriber identity module (SIM) and a second SIM, a primary SIM (202); performing a measurement of a reference signal configured for the primary SIM to obtain a primary result associated with the primary SIM (204); and reporting the primary result (206).

2. The method of solution 1, wherein the measurement is a radio resource management (RRM) measurement.

3. The method of solution 1, wherein the measurement is a radio frequency (RF) calibration measurement.

4. The method of solution 3, wherein the RF calibration measurement is a positioning measurement.

5. The method of solution 1, wherein the primary measurement is configured for a serving cell or a neighboring cell.

6. The method of solution 1, wherein at least the first SIM and the second SIM are associated with the same mobile network operator (MNO).

7. The method of solution 1, wherein at least the first SIM and the second SIM are associated with different MNOs.

8. The method of solution 1, further comprising: reporting a secondary result associated with a secondary SIM configured with the wireless device, wherein the secondary result is set to the primary result.

9. The method of solution 1, further comprising: transmitting an indication that the primary result applies to a secondary SIM configured with the wireless device.

10. The method of solution 9, further comprising: receiving, from a network device, a control signal indicating not to apply the primary result to the secondary SIM.

11. The method of solution 1, further comprising: transmitting, prior to the reporting, an indication that a first measurement result associated with the first SIM applies to the second SIM and/or that a second measurement result associated with the second SIM applies to the first SIM.

12. The method of solution 11, wherein the indication is transmitted to a primary public land mobile network (PLMN) associated with the primary SIM (e.g., as described above in Primary PLMN).

13. The method of solution 11, wherein the indication is transmitted to all PLMNs associated with the first and second SIMs.

14. The method of solution 1, further comprising: receiving, from a network device, a message indicating the network device is shared between a plurality of MNOs.

15. The method of solution 14, wherein the message includes a plurality of PLMN values associated with the plurality of MNOs.

16. The method of solution 14, wherein the message is received via a Master Information Block (MIB) or a System Information Block (SIB).

17. The method of solution 14, wherein the message is received via a Synchronization Signal Block (SSB) or a Channel State Information reference signal (CSI-RS).

18. The method of solution 14, wherein the message indicates one or more frequency bands shared between at least two of the plurality of MNOs.

19. The method of solution 14, further comprising: receiving, from a second network device, a second message indicating the second network device is shared between a second plurality of MNOs.

20. The method of solution 1, wherein the wireless device is in a Radio Resource Control (RRC) idle, RRC inactive, or RRC connected mode.

21. The method of solution 1, wherein the primary SIM is selected at least based on a first RRC mode of the primary SIM.

22. The method of solution 21, wherein the first RRC mode of the primary SIM is connected and a second RRC mode of a secondary SIM is idle or inactive.

23. The method of solution 21, wherein the first RRC mode of the primary SIM is idle and a second RRC mode of a secondary SIM is idle.

24. The method of solution 1, wherein the first SIM and the second SIM operate on the same frequency range (FR).

25. The method of solution 1, wherein the first SIM and the second SIM operate on different FRs.

26. The method of solution 1, wherein the first SIM and the second SIM are configured to operate under different cellular network generations.

For example, the solutions listed below may be used by network device implementations for implementing reference signals as described herein.

Figure 2B:
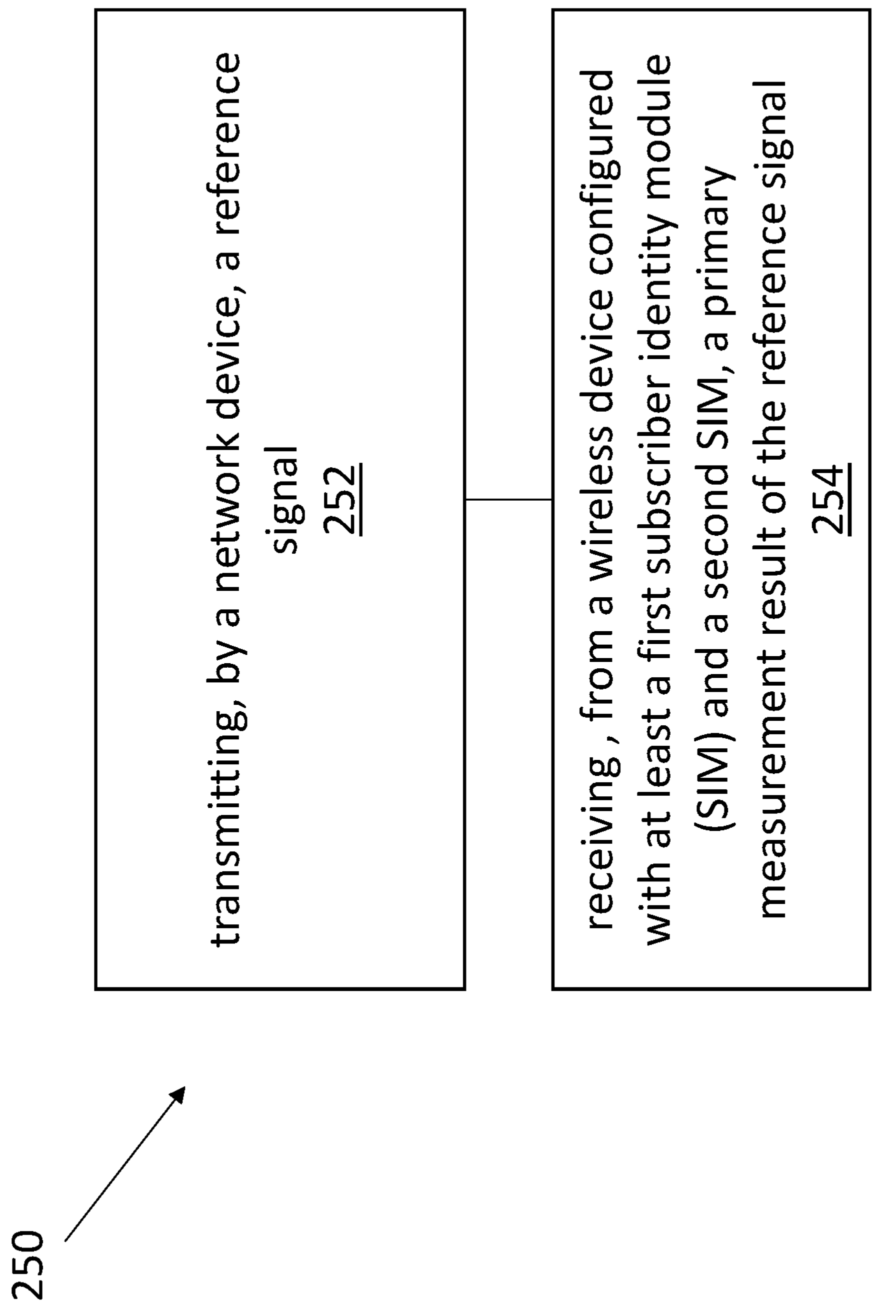
FIG. 2B shows an example method of wireless communication.

27. A method of wireless communication (e.g., method 250 shown in FIG. 2B) comprising: transmitting (252), by a network device, a reference signal; and receiving (254), from a wireless device configured with at least a first subscriber identity module (SIM) and a second SIM, a primary measurement result of the reference signal, wherein the primary measurement result is associated a primary SIM of the wireless device.

28. The method of solution 27, wherein the primary measurement result is a radio resource management (RRM) measurement result.

29. The method of solution 27, wherein the primary measurement result is a radio frequency (RF) calibration measurement result.

30. The method of solution 29, wherein the RF calibration measurement result is a positioning measurement result.

31. The method of solution 27, wherein the primary measurement is configured for a serving cell or a neighboring cell.

32. The method of solution 27, wherein at least the first SIM and the second SIM are associated with the same mobile network operator (MNO).

33. The method of solution 27, wherein at least the first SIM and the second SIM are associated with different MNOs.

34. The method of solution 27, further comprising: receiving a secondary result associated with a secondary SIM configured with the wireless device, wherein the secondary result is set to the primary measurement result.

35. The method of solution 27, further comprising: receiving an indication that the primary measurement result applies to a secondary SIM configured with the wireless device.

36. The method of solution 35, further comprising: transmitting, by the network device, a control signal indicating not to apply the primary result to the secondary SIM.

37. The method of solution 27, further comprising: receiving, prior to the receiving the primary measurement result, an indication that a first measurement result associated with the first SIM applies to the second SIM and/or that a second measurement result associated with the second SIM applies to the first SIM.

38. The method of solution 37, wherein the indication is received at a primary public land mobile network (PLMN) associated with the primary SIM.

39. The method of solution 37, wherein the indication is received at all PLMNs associated with the first and second SIMs.

40. The method of solution 27, further comprising: transmitting, by the network device, a message indicating the network device is shared between a plurality of MNOs.

41. The method of solution 40, wherein the message includes a plurality of PLMN values associated with the plurality of MNOs.

42. The method of solution 40, wherein the message is transmitted via a Master Information Block (MIB) or a System Information Block (SIB).

43. The method of solution 40, wherein the message is transmitted via a Synchronization Signal Block (SSB) or a Channel State Information reference signal (CSI-RS).

44. The method of solution 40, wherein the message indicates one or more frequency bands shared between at least two of the plurality of MNOs.

45. The method of solution 40, further comprising: transmitting, from a second network device, a second message indicating the second network device is shared between a second plurality of MNOs.

46. The method of solution 27, wherein the wireless device is in a Radio Resource Control (RRC) idle, RRC inactive, or RRC connected mode.

47. The method of solution 27, wherein the primary SIM is selected at least based on a first RRC mode of the primary SIM.

48. The method of solution 47, wherein the first RRC mode of the primary SIM is connected and a second RRC mode of a secondary SIM is idle or inactive.

49. The method of solution 47, wherein the first RRC mode of the primary SIM is idle and a second RRC mode of a secondary SIM is idle.

50. The method of solution 27, wherein the first SIM and the second SIM operate on the same frequency range (FR).

51. The method of solution 27, wherein the first SIM and the second SIM operate on different FRs.

52. The method of solution 27, wherein the first SIM and the second SIM are configured to operate under different cellular network generations.

53. An apparatus for wireless communication comprising a processor configured to implement the method of any of solutions 1 to 52.

54. A computer readable medium having code stored thereon, the code when executed by a processor, causing the processor to implement a method recited in any of solutions 1 to 52.

Figure 3:
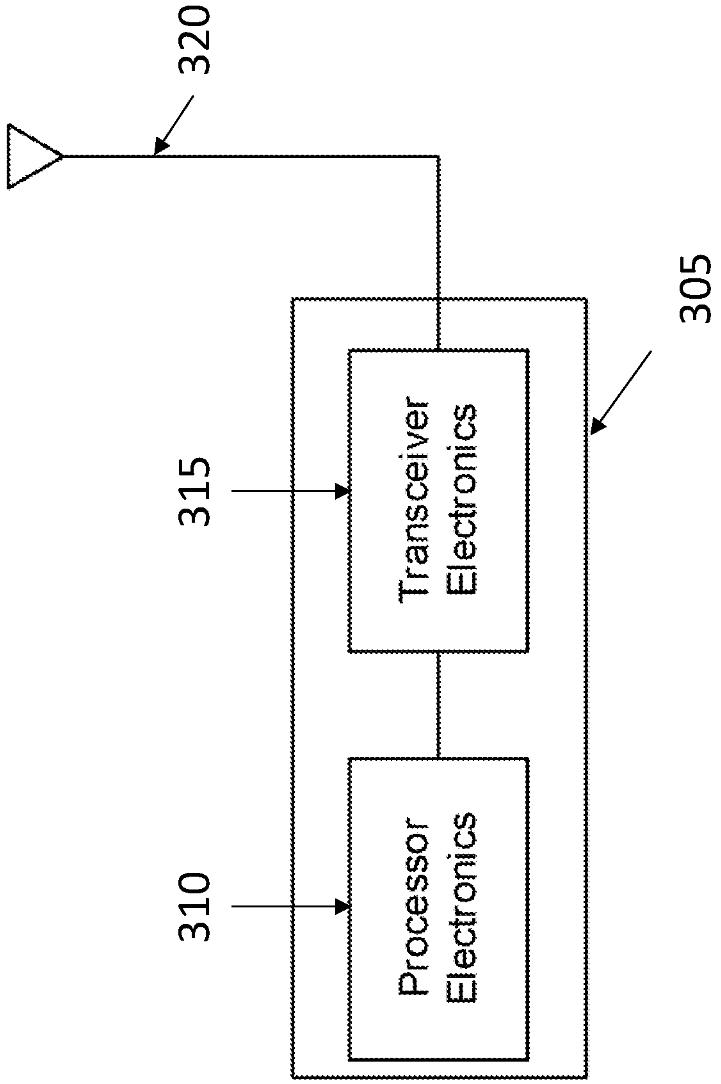
FIG. 3 is a block diagram representation of a portion of an apparatus that can be used to implement methods and/or techniques of the presently disclosed technology.

FIG. 3 is a block diagram representation of a portion of an apparatus, in accordance with some embodiments of the presently disclosed technology. An apparatus 305 such as a network device or a base station or a wireless device (or UE), can include processor electronics 310 such as a microprocessor that implements one or more of the techniques presented in this document. The apparatus 305 can include transceiver electronics 315 to send and/or receive wireless signals over one or more communication interfaces such as antenna(s) 320. The apparatus 305 can include other communication interfaces for transmitting and receiving data. Apparatus 305 can include one or more memories (not explicitly shown) configured to store information such as data and/or instructions. In some implementations, the processor electronics 310 can include at least a portion of the transceiver electronics 315. In some embodiments, at least some of the disclosed techniques, modules or functions are implemented using the apparatus 305.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of wireless communication, comprising:

selecting, by a wireless device configured with at least a first subscriber identity module (SIM) and a second SIM, a primary SIM;

performing a measurement of a reference signal configured for the primary SIM to obtain a primary result associated with the primary SIM; and reporting, by the wireless device, the primary result, wherein the method further comprises:

transmitting a first indication or a second indication, wherein the first indication indicates that the primary result applies to a secondary SIM configured with the wireless device, wherein a received control signal indicates not to apply the primary result to the secondary SIM, wherein the second indication, which is transmitted prior to the primary result being reported, indicates that a first measurement result associated with the first SIM applies to the second SIM or that a second measurement result associated with the second SIM applies to the first SIM.

2. The method of claim 1, wherein the measurement is a radio resource management (RRM) measurement, a radio frequency (RF) calibration measurement, or a positioning reference signal measurement.

3. The method of claim 1, wherein the measurement is configured for a serving cell or a neighboring cell.

4. The method of claim 1, wherein at least the first SIM and the second SIM are associated with a same mobile network operator (MNO) or with different MNOs.

5. The method of claim 4, wherein the first SIM is associated with a first MNO and the second SIM is associated with a second MNO different from the first MNO, and wherein the primary result is reported through a network device or a wireless device connected to both the first MNO and the second MNO.

6. The method of claim 1, further comprising:

reporting a secondary result associated with a secondary SIM configured with the wireless device, wherein the secondary result is set to the primary result.

7. The method of claim 1, wherein the second indication is transmitted to a primary public land mobile network (PLMN) associated with the primary SIM or to all PLMNs associated with the first SIM and the second SIM.

8. A device for wireless communication, comprising:

at least one processor in a wireless device configured to cause the wireless device to:

select a primary subscriber identity module (SIM), wherein the wireless device is configured with at least a first SIM and a second SIM;

perform a measurement of a reference signal configured for the primary SIM to obtain a primary result associated with the primary SIM; and report the primary result, wherein the at least one processor is further configured to cause the wireless device to:

transmit a first indication or a second indication, wherein the first indication indicates that the primary result applies to a secondary SIM configured with the wireless device, wherein a received control signal indicates not to apply the primary result to the secondary SIM, wherein the second indication, which is transmitted prior to the primary result being reported, indicates that a first measurement result associated with the first SIM applies to the second SIM or that a second measurement result associated with the second SIM applies to the first SIM.

9. The device of claim 8, wherein the at least one processor is further configured to:

receive, from a network device, a message indicating the network device is shared between a plurality of MNOs.

10. The device of claim 9, wherein the message includes a plurality of PLMN values associated with the plurality of MNOs.

11. The device of claim 9, wherein the message is received via a Master Information Block (MIB), a System Information Block (SIB), a Synchronization Signal Block (SSB), or a Channel State Information reference signal (CSI-RS).

12. The device of claim 9, wherein the message indicates one or more frequency bands shared between at least two of the plurality of MNOs.

13. The device of claim 9, wherein the at least one processor is further configured to:

receive, from a second network device, a second message indicating the second network device is shared between a second plurality of MNOs.

14. The device of claim 8, wherein the wireless device is in a Radio Resource Control (RRC) idle, RRC inactive, or RRC connected mode.

15. The device of claim 8, wherein the primary SIM is selected at least based on a first RRC mode of the primary SIM.

16. The device of claim 15, wherein (a) the first RRC mode of the primary SIM is connected and a second RRC mode of a secondary SIM is idle or inactive, or (b) the first RRC mode of the primary SIM is idle and the second RRC mode of the secondary SIM is idle.

17. The device of claim 8, wherein the first SIM and the second SIM operate (a) on a same frequency range (FR), (b) on different FRs, or (c) under different cellular network generations.

18. A method of wireless communication comprising:

transmitting, by a network device, a reference signal; and receiving, from a wireless device configured with at least a first subscriber identity module (SIM) and a second SIM, a primary measurement result of the reference signal, wherein the primary measurement result is associated a primary SIM of the wireless device, wherein the method further comprises:

receiving, from the wireless device, a first indication or a second indication, wherein the first indication indicates that the primary measurement result applies to a secondary SIM configured with the wireless device, wherein a received control signal indicates not to apply the primary measurement result to the secondary SIM, wherein the second indication, which is received prior to the primary measurement result being received, indicates that a first measurement result associated with the first SIM applies to the second SIM or that a second measurement result associated with the second SIM applies to the first SIM.

19. The method of claim 18, wherein the primary measurement result applying to the secondary SIM enables an operation of the secondary SIM based on a periodicity of the primary SIM, wherein the operation comprises the secondary SIM being configured to:

perform, at the periodicity of the primary SIM, a measurement of the reference signal, or report, at the periodicity of the primary SIM, a result associated with the measurement.

20. The method of claim 18, wherein a measurement associated with the primary measurement result is a radio resource management (RRM) measurement, a radio frequency (RF) calibration measurement, or a positioning reference signal measurement.

* * * * *